Figure 1:
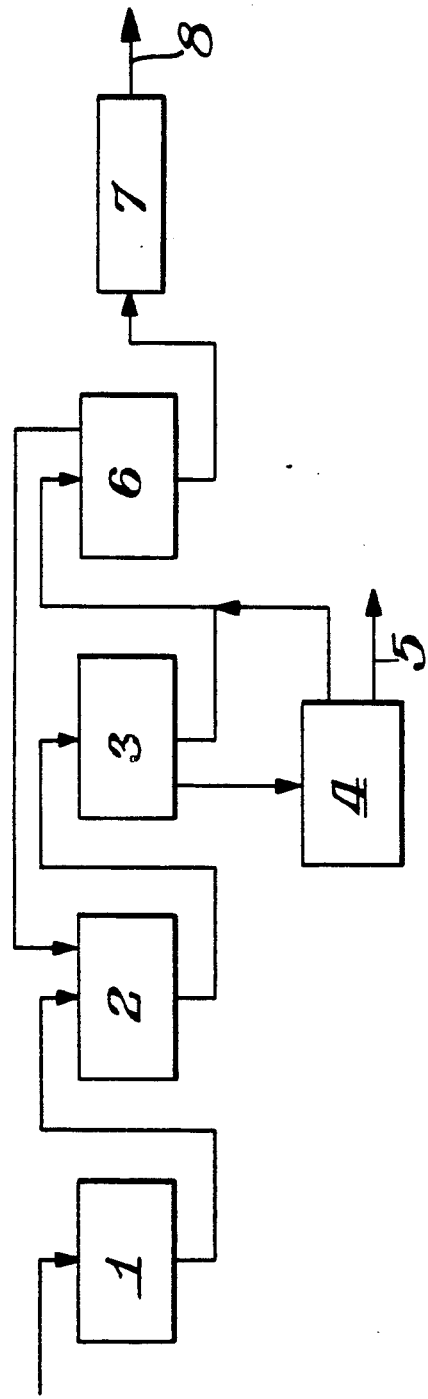
Figure 2:
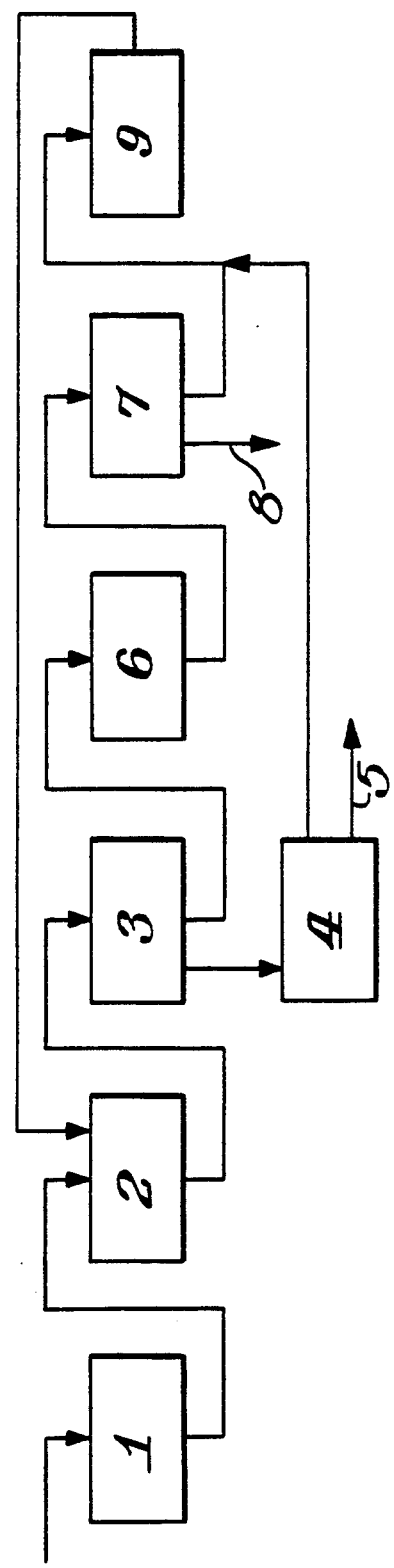

United States Patent
Mertens-Gottselig et al.

[11] Patent Number: 5,232,489
[45] Date of Patent: Aug. 3, 1993

[54] PROCESS FOR THE RECOVERY OF METALS AND COATING MATERIALS FROM COMPOSITE MATERIALS

[75] Inventors: Dagmar Mertens-Gottselig, Bergisch-Gladbach; Gerd Rauser, Wesseling; Werner Löffler, Bonn, all of Fed. Rep. of Germany

[73] Assignee: RWE Entsorgung Aktiengesellschaft, Essen, Fed. Rep. of Germany

[21] Appl. No.: 849,018

[22] PCT Filed: Aug. 29, 1991

[86] PCT No.: PCT/DE91/00682
§ 371 Date: Jul. 13, 1992
§ 102(e) Date: Jul. 13, 1992

[87] PCT Pub. No.: WO92/05215
PCT Pub. Date: Apr. 2, 1992

[30] Foreign Application Priority Data
Sep. 13, 1990 [DE] Fed. Rep. of Germany ....... 4028999
Nov. 26, 1990 [DE] Fed. Rep. of Germany ....... 4037523

[51] Int. Cl.$^5$ .................... B08B 7/00; B08B 3/08
[52] U.S. Cl. .................................................. 75/715
[58] Field of Search ......................................... 75/715

[56] References Cited

U.S. PATENT DOCUMENTS
4,431,458  2/1984  Rosen ................................. 75/715
4,578,184  3/1986  Rasmussen ........................... 209/3

FOREIGN PATENT DOCUMENTS
WO83/02281  7/1983  Denmark .
1417260  12/1975  United Kingdom .

OTHER PUBLICATIONS
Patent Abstracts of Japan, vol. 10, No. 78 (C-335), JP 60-212434, "Separation and Recovery of Composite Material", Oct. 24, 1985.
Patent Abstracts of Japan, vol. 6, No. 227 (C-134), JP 57-131237, "Recovery of ABS Resin From Metal Adhering Thereto", Aug. 14, 1982.

Primary Examiner—Peter D. Rosenberg
Attorney, Agent, or Firm—Connolly and Hutz

[57] ABSTRACT

The present invention relates to a process for the recovery of metals and coatings present on the metals from composite materials by means of the treatment of the composite materials with specific solvents at elevated temperatures, whereby the coating is dissolved and recovered from this solution while the metal is quantitatively separated from the solution in a pure state, after which it can be recycled.

45 Claims, 1 Drawing Sheet

PROCESS FOR THE RECOVERY OF METALS AND COATING MATERIALS FROM COMPOSITE MATERIALS

The present invention relates to a process for the recovery of metals and coatings present on the metals from composite materials by means of the treatment of the composite material with specific solvents at elevated temperatures, whereby the coating is dissolved and recovered from this solution while the metal is separated quantitatively in a pure state from the solution, after which it can be recycled.

The present invention also relates to a device for carrying out the process according to the invention.

The recovery of metals from composite materials, in particular from aluminum laminates, is of considerable economic significance, since such laminates are used on a large scale for packaging purposes.

Composite materials are present in large quantities on the market as packaging materials, for example, for coffee, tea, toothpaste, chemicals, beverages and others. The metal foils in such composite materials generally consist of aluminum, whereas the coating can consist of numerous types of plastics. For example, foils may consist of different polyethylene types, of polypropylene, of polyesters, of polycarbonates, of copolymers such as, for example, ethylene vinyl acetate, ethylene propylene, polyvinyl chloride or epoxy resins. Multi-layered composite materials containing foils of different types of plastics are also available on the market. Furthermore, the metal foil can be coated with materials containing cellulose, for example, paper. Paper coatings can also be present in combination with plastic coatings. The foils can also be joined to each other with or without glues or adhesives. However, composite materials containing metal are not used exclusively as packaging material. Examples of other applications outside the realm of packaging are cables, sheathed wires, closing caps and articles of daily use coated with plastics such as, for example, door handles or tools, also electrical devices, printed circuit boards and numerous other articles of daily use. The more valuable the metal is, the more attractive the recovery of the metals present in composite material becomes; thus, the recovery of copper is also of considerable interest. An important aspect in the recovery of metals can also be the separation of the metals for environmental reasons, since it s known that heavy metals are released into the atmosphere in small quantities when the composite materials are incinerated in their entirety.

Numerous recovery processes are described in the literature.

Thus, East German patent no. 218,313 describes a process in which aluminum and polyvinyl chloride are recovered from an aluminum/polyvinyl chloride foil by means of grinding and mechanical separation.

A mechanical separation process for separating composite materials like electric cables and wires or similar materials is described in French Patent no. 2,528,351.

Japanese patent no. 57,043,941, discloses a process according to which composite materials undergo a pyrolysis operation in which the plastic material degrades and the pyrolysis gases are used as fuel for maintaining the pyrolysis temperature.

According to Japanese patent no. 54,127,983, polyvinyl chloride laminated aluminum foils are treated with carbon tetrachloride, whereby two solvent layers are formed; the lower one contains the aluminum and the upper one contains the polyvinyl chloride.

Analogously, according to Japanese patent no. 54,026,871, copper is recovered from a formaldehyde phenol resin/copper laminate by means of treatment with trichlorethylene.

According to Japanese preliminary published application no. 51,020,976, mixtures of aluminum foils laminated with different thermoplastics are treated with xylene as well as with phenol at various temperatures. The laminates contain polypropylene, ethylene vinyl acetate copolymer, poly(ethylene)terephthalate, polycarbonate and polyethylene. By applying the solvents under different conditions, the thermoplastic materials can be separated from each other to a certain extent.

According to Japanese patent no. 60,212,434, an aluminum/polyvinyl chloride laminate which is fused together with an ethylene vinyl acetate copolymer adhesive is treated with a solvent mixture consisting of acetic acid ethylester, isopropanol, acetone and toluene for 30 minutes at room temperature. In this process, the adhesive is dissolved, so that the aluminum foil and the polyvinyl chloride are then separated from each other.

U.S. Pat. No. 4,168,199 discloses the removal of paper from an aluminum/paper laminate. For this purpose, the material is treated with water for 10 minutes at a temperature of 120° C. [248° F.] in a nitrogen atmosphere.

A similar process is described in Japanese patent no. 54,088,817.

Although Japanese patent application no. 51,020,976 uses xylene as the solvent for the coating materials polyethylene, polypropylene, ethylene vinyl acetate copolymer and polycarbonate, whereby the latter two thermoplastic materials are already supposed to dissolve at room temperature while the thermoplastic materials polyethylene and polypropylene are supposed to dissolve in hot xylene at a temperature ranging from 120° C. to 130° C. [248° F. to 266° F.], the studies of the applicant have shown that, under these conditions, complete separation of the plastic coatings does not occur and thus a pure aluminum cannot be obtained.

In contrast, it has been found that a number of composite foils such as, for example, packaging materials made of aluminum/polyethylene or polypropylene or ethylene/propylene copolymer foils, or else composite materials consisting of several layers are on the market, which dissolve completely in xylene only at a temperature of approximately 200° C. [392° F.] under the inherent pressure of xylene; the reasons for this low solubility is not known, whereas at least the boiling temperature of xylene is necessary in order to dissolve other polyethylene and polypropylene laminates. The Titalyse company has published a process in which the aluminum is dissolved in acids, so that the plastic foil is maintained.

The object of the present invention is to create a process for the separation and recovery of the coating materials and metals from composite materials which, in a simple and economical way, permits the recovery of the metal as well as of the coating materials in as quantitative and in as pure a state as possible, and to recycle the solvent used.

The applicant has now found a process for the recovery of metals and coating materials from composite materials by using solvents to dissolve the coatings present on the metal, characterized in that, in order to dissolve non-polar layers, the composite material is heated with dimethyl and/or trimethyl and/or tetramethyl benzenes and/or ethyl benzene and/or isopropyl benzene to a temperature ranging from 40° C. to 280° C. [104° F. to 536° F.], preferably from 75° C. to 220° C. [167° F. to 428° F.] and especially preferred from 138.4° C. to 204° C. [281.1° F. to 399.2° F.] without pressure or under pressure, during a residence time of 0.5 to 360 minutes, preferably of 5 to 120 minutes and especially preferred of 5 to 60 minutes, and in that, in order to dissolve polar layers, the composite materials are heated with tetrahydrofurane and/or its methylated derivatives and/or dioxane and/or its methylated derivatives to a temperature ranging from 40° C. to 280° C. [104° F. to 536° F.], preferably from 60° C. to 200° C. [140° F. to 392° F.], without pressure or under pressure, during a residence time of 0.5 to 360 minutes, preferably of 5 to 120 minutes and especially preferred of 5 to 60 minutes.

Furthermore, the applicant has also found a process for the recovery of metals and coating materials from composite materials by using solvents to dissolve the coatings present on the metal, characterized in that, in order to dissolve the layers, the composite material is heated with $C_3-C_{18}$ ketones and/or $C_3-C_{18}$ polyketones to a temperature ranging from 40° C. to 280° C. [104° F. to 536° F.], preferably from 75° C. to 220° C. [167° F. to 428° F.] and especially preferred from 100° C. to 220° C. [212° F. to 428° F.] without pressure or under pressure, during a residence time of 0.5 to 360 minutes, preferably of 5 to 120 minutes and especially preferred of 5 to 60 minutes.

Finally, the applicant has also invented a device for carrying out the processes cited above.

The present invention now makes it possible, by employing special solvents and special conditions, to recover the metals in such a pure state that they can be used again in composite materials or for new applications without any further treatment. The studies of the applicant have shown that the metal from the widely used packaging foils consisting of a metal foil, in particular aluminum, and of a non-polar layer like a polyethylene or polypropylene foil, can be recovered quantitatively in a very pure state by heating the composite material with di-, tri-, tetramethyl benzenes, ethyl benzene and isopropyl benzene or mixtures of these hydrocarbons until the coating material is dissolved and then separating the metal and, in general, subsequently subjecting it to an after-treatment with at least one of the hydrocarbons mentioned above. Since the boiling points of di-, tri- and tetramethyl benzenes lie at temperatures ranging from 138.4° C. and 203.2° C. to 204° C. [281.1° F. and 397.8° F. to 399.2° F.], the solvent can be chosen in such a way that this solvent treatment can be carried out without pressure. This is advantageous from the point of view of the process technology. Furthermore, according to the invention, it is also possible to work under pressure in closed tanks. For instance, xylene can be heated to a temperature of 200° C. [392° F.], as a result of which an inherent pressure of 5 to 6 bar is achieved. The xylenes are advantageously used as a technical mixture, whereby technical mixtures are known to have highly divergent compositions, depending on the location in a xylene unit from which the mixture is withdrawn and depending on which process for the production of pure xylenes is involved. Often, besides small quantities of trimethyl benzenes, such mixtures also contain small quantities of ethyl benzene and non-aromatic hydrocarbons.

A suitable $C_8$ mixture consists, for example, of 1 to 4 percent by weight of non-aromatic compounds, 19 to 23 percent by weight of ethyl benzene, 16 to 20 percent by weight of p-xylene, 40 to 45 percent by weight of m-xylene and 10 to 15 percent of o-xylene which, depending on the mixture, add up to 100%. In this case, however, depending on the plastic material to be dissolved, two phases can be formed during the dissolving step which have different plastic concentrations instead of one homogeneous solution at a high concentration.

Basically, the individual aromatic hydrocarbons or other mixtures can also be used.

In the case of trimethyl benzenes, individual isomers as well as mixtures can also be used. The same applies to the tetramethyl benzenes, whereby the mixtures may also contain 1,2,4,5-tetramethyl benzene, although the substance is a solid in its pure state at normal temperature, and it melts at a temperature between 81° C. and 82° C. [177.8° F. and 179.6° F.].

The boiling points of the aromatic hydrocarbons are 143.6° C. [290.5° F.] for o-xylene, 139° C. [282.2° F.] for m-xylene and 138.4° C. [281.1° F.] for p-xylene. 1,3,5-trimethyl benzene has a boiling point of 164.6° C. [328.3° F.], 1,2,4-trimethyl benzene has a boiling point of 170.2° C. [338.4° F.], 1,2,3-trimethyl benzene has a boiling point of 175.6° C. [348.1° F.], 1,2,3,5-trimethyl benzene has a boiling point of 195° C. to 197° C. [383° F. to 386.6° F.], 1,2,3,4-trimethyl benzene has a boiling point of 203° C. to 204° C. [397.4° F. to 399.2° F.], ethyl benzene has a boiling point of 136.1° C. [277° F.], and isopropyl benzene has a boiling point of 152.5° C. [277.5° F.]. According to the invention, any mixtures of at least two of the hydrocarbons named above can also be used. In this context, in the presence of xylenes or ethyl benzene or of their mixtures, it is not possible to work without pressure at a temperature of 200° C. [392° F.]. Surprisingly, however, it has been found that, in the presence of higher boiling methylated methyl benzenes, the solubility is much better in the same temperature range as compared to the lower boiling methylated methyl benzenes, for example, a xylene mixture which is used under boiling conditions. As a result, relatively short residence times can be selected. Generally speaking, however, the residence time should not be less than 5 to 10 minutes. Another group of solvents which is suitable according to the invention is ketones and polyketones, namely, $C_3-C_{18}$ ketones and $C_3-C_{18}$ polyketones. The ketones can be open-chain as well as cyclical ketones such as, for example, cyclopentanone with a boiling point of 129° C. [264.2° F.], cyclohexanone with a boiling point of 155.7° C. [312.3° F.], cycloheptanone with a boiling point of 179° C. to 181° C. [354.2° F. to 357.8° F.], cyclooctanone and higher derivatives, acetylacetone with a boiling point of 194° C. [381.2° F.], and 2,7-octanedione with a boiling point of 114° C. [237.2° F.] (13 mbar).

According to the invention, any mixture of the following groups can also be used in selected proportions:
a) dimethyl, trimethyl, tetramethyl benzene, ethyl benzene, isopropyl benzene;
b) tetrahydrofurane, methylated tetrahydrofurane, dioxane, methylated dioxane;
c) $C_3-C_{18}$ ketones and $C_3-C_{18}$ polyketones.

The temperatures for dissolving the plastic layers can range from 40° C. to 280° C. [104° F. to 536° F.], preferably from 75° C. to 220° C. [167° F. to 428° F.] and especially preferred from 138.4° C. to 204° C. [281.1° F. to 399.2° F.] in the case of aromatic solvents and especially preferred from 100° C. to 200° C. [212° F. to 392° F.] in the case of ketone compounds, whereas the preferred temperature for tetrahydrofurane and dioxane and their derivatives ranges from 60° C. to 200° C. [140° F. to 392° F.].

The residence time during the dissolving process is 0.5 to 360 minutes, preferably 5 to 120 minutes and especially preferred 5 to 60 minutes. In general, low temperatures are used in combination with longer residence times.

The dissolving process can take place without pressure or under pressure, preferably, however, without pressure, whereby the solvents are chosen in such a way that the boiling point is not exceeded. The composite materials to be processed according to the invention can have any arrangement of layers, whereby the layers may have any thickness, depending on the applications in question. The layers can be applied onto the metal by any method such as, for example, a vapor-blast process or coating or any other process.

The process according to the invention leads to the result that the thermoplastic materials such as polyethylene—this also applies to the different ethylene or polyethylene types like LD, HD and LLD polyethylene, polypropylene and ethylene/propylene copolymer—dissolve in solvents, and so does the glue or the adhesive, if the composite material contains these substances. The plastics can be recovered by means of the process according to the invention. This can be carried out in a known manner, for example, through precipitation by distilling off at least part of the solvent, precipitation by cooling the solution or precipitation by addition of a solvent in which the plastic material dissolves only slightly or not at all. In this manner, it is possible to obtain the plastic material as a fine-grained, free-flowing granulate which can be directly used for further processing to make finished products. Especially in the case of precipitation by cooling, caking and sticking together of the plastics particles can be prevented by means of rapid precipitation if this step exhibits a great dependence on the solubility behavior. The heat released during this programmed crystallization in the precipitation tank can be transferred via heat exchangers to the recycled solvent.

A technically advantageous process consists of largely removing the solvent, for example, by distillation, optionally in a vacuum, and extrusion in an extruder which can be evacuated, resulting in a granulate which is free of solvents. The metals recovered in this way can be separated by filtration, magnetically or according to other processes.

Although the above-mentioned hydrocarbons are also capable of at least partially dissolving other thermoplastic materials such as, for example, polyesters, polycarbonates, polyvinyl chloride, ethylene vinyl acetate copolymers, epoxy resins or others, it has turned out to be advantageous according to the invention to use tetrahydrofurane and/or dioxane, depending on the polarity of the polymer building blocks, although methylated derivatives can also be employed. Here, too, very good results can be obtained, in other words, very pure metals can already be obtained at residence times of 5 minutes, depending on the temperature used. Temperatures of up to 280° C. [536° F.] can be used, whereby it is advantageous to work under the inherent pressure.

In the case of multi-layered composite materials, for example, in the case of packaging foils consisting of aluminum, polyethylene and polyester foils, the dissolving processes named above can be carried out one after the other; for example, if the polyethylene foil is on the outside, methyl benzenes are applied first and subsequently tetrahydrofurane and/or dioxane. Although total residence times of up to 360 minutes can be employed, in general, the residence times, as already outlined above, can be considerably shorter for each stage, for example, 5 to 60 minutes. Treatment with a mixture of polar and non-polar solvents is also possible according to the invention. Finally, according to the invention, composite materials can also be processed which contain several metal layers and which can consist of the same metal or of different metals.

The use of ketone solvents has proven its worth in dissolving non-polar layers but also, depending on the structure of the ketones, for polar layers such as, for example, layers of polyacrylate polyester copolymers, polyester and polyvinyl chloride.

It is often possible to obtain plastic materials from these solvents in pure, finely distributed form, simply by cooling the solution.

The plastic layers in composite foils are very often thermoplastic materials such as the different types of polyethylene and polypropylene, polyester, polyvinyl chloride and others. Composite foils containing these and other thermoplastic materials are especially well suited for the process according to the invention. Nevertheless, layers consisting of resins such as, for example, epoxy resins and elastomers can also be processed according to the invention.

The quantity of solvent with respect to the composite material used can vary within a wide range. A suitable ratio is in the range of 1 to 15 parts by weight of the solvent per part by weight of the composite material. Concentrated plastic solutions are preferred because the separation of the solvent is less complicated and therefore more economical. For cost reasons, the proportion of solvent should not exceed 15 parts per weight. It has been surprisingly found that $C_9$ aromatic compounds have a particularly high dissolving capacity for numerous thermoplastic materials. As a result, plastic concentrations of 40 percent by weight in the solution can easily be achieved. Technical $C_9$ aromatic fractions from platformer and xylene units, for example, are especially well suited. Technical $C_{10}$ aromatic fractions or mixtures of technical $C_9$ and $C_{10}$ aromatic fractions are also very well suited. The ratio of composite material to solvent can also be greater than 1, if so desired.

Other composite materials can also be processed, analogously to packaging foils. In general, it is undesirable to crush such reusable materials such as, for example, door handles which are coated with plastic materials. On the contrary, the entire composite piece is subjected to a solvent treatment. In such cases, it is practical to use solution tanks such as, for instance, slow stirring, tumbling, rotating or other dissolving apparatuses.

The solvents used according to the present invention can be recycled into the solution tank after being at least partially separated from the dissolved plastic. Accordingly, the solvent can be recirculated.

The metal which is removed from the plastic foils can be separated in a conventional manner, for example, by filtration, decanting or centrifuging, and usually undergoes a washing stage. For this purpose, the same solvent as the one employed in the dissolving stage is used, or else another suitable solvent is employed. The aftertreatment serves to remove very thin layers of plastic material from the metal, such as may have been deposited by the drying of solvents from the first stage. The temperature in the after-treatment stage can advantageously lie between room temperature and a temperature of 280° C. [536° F.], with residence times ranging from 1 to 120 minutes. Advantageously, short residence times should be selected in combination with a sufficiently high temperature and working conditions without pressure. However, in this context, the person skilled in the art has access to a very broad range of temperatures and residence times.

Subsequently, the metal is separated from the washing solution, dried and is then ready for reuse.

In order to recover metals from metal/plastic composite materials, from composite materials made of materials containing metal and cellulose such as paper or from composite materials consisting of metal, plastic foils and paper, the shredded composite material is heated to a temperature ranging from 100° C. to 200° C. [212° F. to 392° F.] with water, which may additionally contain small quantities of additives such as, for instance, alcohols, like methanol or ethanol or small quantities of ketones such as, for instance, acetone or methyl ethyl ketone or other additives which improve the dissolving process. The residence time is 5 to 120 minutes. Depending on the type of paper, the conditions can be varied within a wide range here as well. Although at least part of the paper can dissolve as a consequence of hydrolysis of the cellulose, in general, paper and cellulose are obtained as a pulp containing valuable cellulose, which can be reused as such.

An after-treatment can be necessary or advantageous in this case as well.

The separation of the paper from composite foils is the state of the art and will not be elaborated upon here in more detail.

Apparatus 1 serves once again for shredding the composite foil material which is already free of paper. 2 is the dissolving tank. In 3, the metal is separated from the solution. The separated metal is rinsed in 4. At 5, the pure metal is withdrawn. The rinsing agent is fed from 4 to 9. In 9, the solvent is distilled off and recycled to 2. The solution from 6 is fed into tank 7 where the coating material, for example, polyethylene is precipitated as a granular, free-flowing material by means of cooling or precipitating with a precipitation agent and withdrawn via 8.

In all examples, determining the yields as well as the purity of the metal separated was carried out in the following manner using an atom absorption spectrometer:

For determining the yield, a sample of the composite foil was weighed and the percentage by weight of aluminum in the foil was determined in an atom absorption spectrometer. The metal obtained by the process according to the invention was weighed and a sample of this was weighed and analyzed in the atom absorption spectrometer and the percentage by weight of the aluminum was determined. In all cases, the metal samples consisted of aluminum with a purity level of 100 percent. Thus, they were completely free of foil components. The yield of aluminum was 100 percent.

The plastic solution was subsequently concentrated by evaporation in a flash evaporator and fed into a de-gassing extruder via an evaporation chamber. In this process, a polyethylene granulate free of solvent was obtained.

EXAMPLE 2

Example 1 was repeated, except with a mixture of solvents consisting of $C_9$ and $C_{10}$ methyl benzenes having a boiling range from 175° C. to 204° C. [347° F. to 399.2° F.].

In the dissolving tank, a 40 percent-by-weight solution of polyethylene was obtained. This solution was fed in a countercurrent into a multi-stage cascade, while a 3 percent polyethylene solution in the same solvent flowed in a counter-current to the solution containing the aluminum. The aluminum rinsed in this manner was separated in a centrifuge and then rinsed with the same solvent at 180° C. [356° F.].

Like in Example 1, pure aluminum was obtained in a quantitative yield and also like in Example 1, a polyethylene granulate free of solvent was obtained quantitatively.

EXAMPLE 3

Example 1 was repeated, except that the mixture was stirred for 2 minutes at a temperature of 220° C. [428° F.] under inherent pressure. The same results were obtained as in Example 1.

EXAMPLE 4

Example 1 was repeated, except that the coating consisted of polypropylene. The results corresponded to those described in Example 1.

EXAMPLE 5

Example 1 was repeated, except that the ratio of composite material to solvent was 1:5.

Like in Example 1, a pure aluminum and a polyethylene free of solvent were obtained in a quantitative yield.

EXAMPLE 6

500 grams of aluminum laminate shredded to a particle size of 4 mm and having a thickness of the aluminum foil of 0.1 mm and a thickness of the LLD-PE foil of 0.8 mm were heated while being stirred for 15 minutes with 1000 grams of a mixture of 50 percent by weight of 1,2,3-trimethyl benzene and 50 percent by weight of 1,2,4-trimethyl benzene at a temperature of 170° C. [338° F.]. Subsequently, the metal was sieved out and treated for 5 minutes with 1000 grams of the trimethyl benzene mixture at a temperature of 100° C. [212° F.]. A completely pure aluminum was obtained in a quantitative yield. The polyethylene solution was treated as described in Example 1.

EXAMPLE 7

Example 1 was repeated, except that 1000 g of 1,2,3,5-tetramethyl benzene were heated for 0.5 minutes at a temperature of 260° C. [500° F.] while being stirred under inherent pressure. Subsequently, the sieved out metal was treated for 5 minutes with 1000 grams of the same tetramethyl benzene at a temperature of 150° C. [302° F.]. The sieved out aluminum was dried. Completely pure aluminum was obtained in a quantitative yield. The polyethylene solution was processed as described in Example 1.

EXAMPLE 8

Example 1 was repeated, except that the foil was treated with 3000 grams of isopropyl benzene for 120 minutes at a temperature of 40° C. [104° F.].

Subsequently, the aluminum was sieved out and washed at a temperature of 100° C. [212° F.] with 1000 grams of isopropyl benzene.

After sieving out and drying again, a very pure aluminum was obtained in a quantitative yield. The polyethylene was recovered as described in Example 1.

EXAMPLE 9

A steel door handle coated with polyethylene having a layer thickness of 1.5 mm, was treated in a tumbling reactor for 15 minutes at a temperature of 170° C. [338° F.] with 1000 ml of a mixture consisting of 50 percent by weight of 1,2,4-trimethyl benzene and 50 percent by weight of 1,2,3,5-trimethyl benzene. Subsequently, the door handle was taken out of the solvent, rinsed with hot solvent and dried. The steel was completely free of polyethylene. The polyethylene was recovered as described in Example 1.

EXAMPLE 10

400 grams of a foil consisting of aluminum having a layer thickness of 0.5 mm, a polyester foil having a layer thickness of 0.2 mm and an outer layer of polyethylene having a thickness of 0.3 mm were processed as described in Example 1 with the technical $C_9$ fraction.

Subsequently, the foil was decanted and rinsed and the remaining foil, which was still coated with polyester, was treated with 1500 ml of tetrahydrofurane for 10 minutes at a temperature of 100° C. [212° F.] under inherent pressure. The aluminum was sieved out and dried.

A completely pure aluminum was obtained in a quantitative yield. The polyethylene and the polyester were recovered as described in Example 1.

EXAMPLE 11

Example 10 was repeated with dioxane, and the same results were obtained.

EXAMPLE 12

A laminate made of a copper foil having a particle size of 10 mm and a layer thickness of 0.01 mm and of a polypropylene layer having a thickness of 0.3 mm was treated with a 1:1:1 mixture of the three trimethyl benzene isomers for 5 minutes at a temperature of 160° C. [320° F.].

Subsequently, the copper was sieved out and aftertreated for 5 minutes at a temperature of 160° C. [320° F.] with the same solvent.

Completely pure copper was obtained in a quantitative yield. The polypropylene was recovered as usual.

EXAMPLE 13

600 grams of an aluminum foil shredded to a particle size of 4 mm and having a layer thickness of 0.01 mm and of a polyethylene foil having a layer thickness of 0.5 mm were stirred with 6000 grams of a technical xylene mixture consisting of 4 percent by weight of non-aromatic compounds, 20 percent by weight of ethyl benzene, 16 percent by weight of p-xylene, 40 percent by weight of m-xylene and 20 percent by weight of o-xylene for 20 minutes at a temperature of 140° C. [284° F.].

Subsequently, the aluminum was sieved out and stirred with 1500 grams of added fresh xylene for 20 minutes at a temperature of 140° C. [284° F.]. The aluminum was sieved out again and dried. It contained only very small residues of polyethylene.

EXAMPLE 14

400 grams of an aluminum foil shredded to a particle size of 5 mm and having a layer thickness of 0.01 mm and of a polyester foil having a layer thickness of 0.3 mm were stirred with 2000 grams of tetrahydrofurane for 5 minutes at a temperature of 150° C. [302° F.] under pressure.

Subsequently, the aluminum was sieved out and stirred with 500 grams of added fresh tetrahydrofurane for 10 minutes at a temperature of 140° C. [284° F.] under pressure.

The tetrahydrofurane was concentrated to half its original amount. Subsequently, the polyester was precipitated by the addition of toluene and cooling to a temperature of 50° C. [122° F.].

EXAMPLE 15

500 grams of an aluminum laminate shredded to a particle size of 4 mm and having an aluminum foil thickness of 0.1 mm and an HD-PE foil thickness of 0.5 mm were treated for 15 minutes while being stirred with 2000 grams of cyclohexanone at a temperature of 150° C. [302° F.] under inherent pressure. Subsequently, the metal was sieved out and treated for 10 minutes with 1000 grams of cyclohexanone at a temperature of 100° C. [212° F.]. A completely pure aluminum was obtained in a quantitative yield. The cyclohexanone solution was cooled down to a temperature of 80° C. [176° F.], whereby the polyethylene was precipitated in a granular, finely distributed and free-flowing state, after which it was separated by means of filtration.

EXAMPLE 16

Example 15 was repeated, but acetyl acetone was used instead of cyclohexanone. Analogously to Example 15, a very pure aluminum was obtained in a quantitative yield. By cooling down the polyethylene solution to a temperature of 80° C. [176° F.], the polyethylene was precipitated in a granular state.

We claim:

1. Process for the recovery of metals and coating materials from composite materials by dissolving the coating on the metals with solvents, comprising dissolving unpolar coatings of the composite material by heating with dimethyl- or trimethyl- or tetramethylbenzene or ethylbenzene or isopropylbenzene or mixtures thereof, from 40° C. up to 280° C. without pressure or under, during a residence time of 0.5 to 360 minutes that in the case of polar coatings the composite material is heated with tetrahydrofurane or its methylated derivatives or dioxane or its methylated derivatives or mixtures thereof to 40° C. up to 280° C. without pressure or under pressure, during a residence time of 0.5 to 360 minutes.

2. Process for the recovery of metals and coating materials from composite materials by dissolving the coatings on a metal with solvents, comprising dissolving the coatings of the composite material and heating with $C_3$–$C_{18}$-ketones or $C_3$–$C_{18}$-polyketones or mixtures thereof to 40° C. up to 280° C. without pressure or under pressure, during a residence time of 0.5 to 360 minutes.

3. Process according to claim 1, wherein in dissolving the coating(s) at least 2 components of the groups
 a) dimethyl-, trimethyl-, tetramethylbenzene, ethylbenzene, or isopropylbenzene;

b) tetrahydrofurane, methylated tetrahydrofurane, dioxane, or methylated dioxane; and c) $C_3$–$C_{18}$-polyketones are used in adjusted quantities.

4. Process according to claim 1, wherein a solvent is used which consists at least predominantly of $C_9$-aromatics.

5. Process according to claim 1, wherein after separation of the metal component of the composite material the coating material is at least in part precipitated from the solution, which contains the dissolved coating by cooling.

6. Process according to claim 1, wherein after separation of the metal component of the composite material the coating material is precipitated at least in part from the solution, which contains the dissolved coating by addition of a precipitating agent.

7. Process according to claim 1, wherein the coating material is precipitated from the solution in a finely divided, free-flowing state.

8. Process according to claim 1, wherein the coatings are thermoplastics.

9. Process according to claim 1, wherein after separation of the metal component of the composite material, the solvent of the coating solution is at least predominantly separated and the remaining material is extruded in an extruder.

10. Process according to claim 1, wherein a technical xylene-mixture is used consisting of 1–4 weight-% of non-aromatics, 19–23 weight-% ethylbenzene, 16–20 weight-% p-xylene, 40–45 weight-% m-xylene and 10–15 weight-% o-xylene, whereby the components of the mixture make up to 100%.

11. Process according to claim 1, wherein 1–15 parts by weight of the solvent are used per part by weight of the composite material.

12. Process according to claim 1, wherein the metal separated is subjected to an aftertreatment with 1 or several of the solvents at temperatures of 10° C.–200° C. under pressure or without pressure during a residence time of 0.5 to 120 minutes.

13. Process according to claim 1, wherein the solvent is selected can be operated without pressure.

14. Process according to claim 1, wherein a technical $C_9$-mixture of aromatics is used.

15. Process according to claim 1, wherein a technical $C_{10}$-mixture of aromatics is used.

16. Process according to claim 1, wherein a technical $C_9$–$C_{10}$-mixture of aromatics is used.

17. A device for carrying out the process for the recovery of metals and casting materials from composite materials by dissolving the coating on the metals with solvents, comprising a means for dissolving, followed by a metal separator, and then either (a) followed by a precipitation reactor and a filter or comparable device behind the precipitation reactor or (b) followed by a separation device for at least partly separating the solvent, followed by an extruder.

18. A device according to claim 17 wherein said device comprises a means for dissolving, followed by a metal-separator, followed by a separation device for at least partly separating the solvent, followed by an extruder which can be operated under vacuum.

19. A device according to claim 17, wherein the means for dissolving is preformed by an agitator vessel.

20. Process as claimed in claim 1, wherein dissolving unpolar coatings the composite material is heated from 75° C. up to 220° C.

21. Process as claimed in claim 1, wherein dissolving unpolar coatings the composite material is heated from 138.4° C. to 204° C.

22. Process as claimed in claim 1, wherein dissolving unpolar coatings the composite material is without pressure or under pressure, during a residence time of 5 to 120 minutes.

23. Process as claimed in claim 1, wherein dissolving unpolar coatings the composite material is without pressure or under pressure, during a residence time of 5 to 60 minutes.

24. Process as claimed in claim 1, wherein dissolving polar coatings the composite material is heated from 60° C. to 200° C.

25. Process as claimed in claim 1, wherein dissolving polar coatings the composite material is without pressure or under pressure, during a residence time of 5 to 120 minutes.

26. Process as claimed in claim 1, wherein dissolving polar coatings the composite material is without pressure or under pressure, during a residence time of 5 to 60 minutes.

27. Process as claimed in claim 2, wherein dissolving the coatings the composite material is heated from 75° C. up to 220° C.

28. Process as claimed in claim 2, wherein dissolving the coatings the composite material is heated from 100° C. up to 220° C.

29. Process as claimed in claim 2, wherein dissolving the coatings the composite material is without pressure or under pressure, during a residence time of 5 to 120 minutes.

30. Process as claimed in claim 2, wherein dissolving the coatings the composite material is without pressure or under pressure, during a residence time of 5 to 60 minutes.

31. Process according to claim 2, wherein in dissolving the coating(s) at least 2 components of the groups a) dimethyl-, trimethyl-, tetramethylbenzene, ethylbenzene, or isopropylbenzene;

b) tetrahydrofurane, methylated tetrahydrofurane, dioxane, or methylated dioxane; and c) $C_3$–$C_{18}$-polyketones are used in adjusted quantities.

32. Process according to claim 2, wherein a solvent is used which consists at least predominantly of $C_9$-aromatics.

33. Process according to claim 2, wherein after separation of the metal component of the composite material the coating material is at least in part precipitated from the solution, which contains the dissolved coating by cooling.

34. Process according to claim 2, wherein after separation of the metal component of the composite material the coating material is precipitated at least in part from the solution, which contains the dissolved coating by addition of a precipitating agent.

35. Process according to claim 2, wherein the coating material is precipitated from the solution in a finely divided, free-flowing state.

36. Process according to claim 2, wherein the coatings are thermoplastics.

37. Process according to claim 2, wherein after separation of the metal component of the composite material, the solvent of the coating solution is at least predominantly separated and the remaining material is extruded in an extruder.

38. Process according to claim 2, wherein 1–15 parts by weight of the solvent are used per part by weight of the composite material.

39. Process according to claim 2, wherein the metal separated is subjected to an aftertreatment with 1 or several of the solvents at temperatures of 10° C.–200° C. under pressure or without pressure during a residence time of 0.5 to 120 minutes.

40. Process according to claim 2, wherein the solvent is selected can be operated without pressure.

41. Process according to claim 2, wherein a technical $C_9$-mixture of aromatics is used.

42. Process according to claim 2, wherein a technical $C_{10}$-mixture of aromatics is used.

43. Process according to claim 2, wherein a technical $C_9$–$C_{10}$-mixture of aromatics is used.

44. Process according to claim 9, wherein the extruder is operated under vacuum to form a granular material.

45. Process according to claim 37, wherein the extruder is operated under vacuum to form a granular material.

* * * * *